(No Model.)
E. THOMSON.
ELECTRIC METER.
No. 539,886. Patented May 28, 1895.
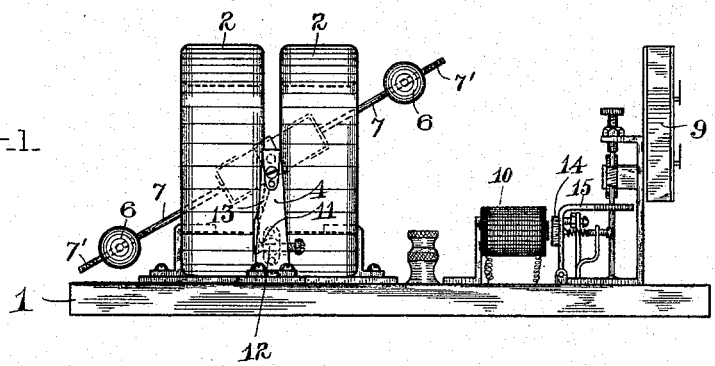
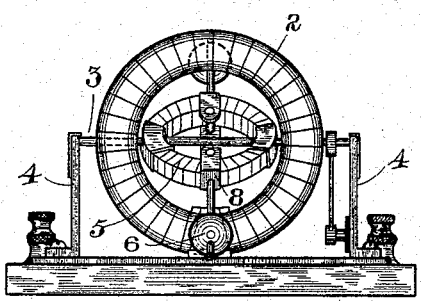
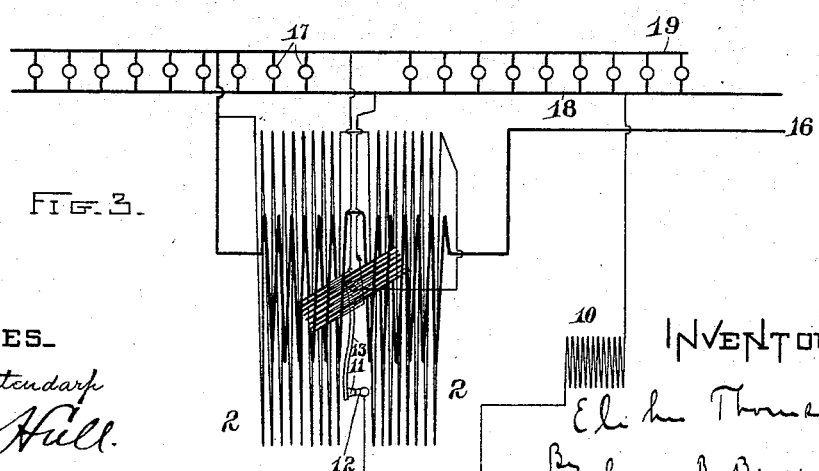

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ELECTRIC METER.

SPECIFICATION forming part of Letters Patent No. 539,886, dated May 28, 1895.

Application filed February 18, 1895. Serial No. 538,793. (No model.)

*To all whom it may concern:*

Be it known that I, ELIHU THOMSON, a citizen of the United States, residing at Swampscott, in the county of Essex, State of Massachusetts, have invented certain new and useful Improvements in Electric Meters, of which the following is a specification.

This invention has for its object to provide a simple and novel apparatus for measuring and registering the amount of current or energy consumed in electric circuits, as hereinafter set forth and claimed.

Referring to the accompanying drawings, Figure 1 is a view in side elevation of an apparatus embodying this invention. Fig. 2 is an end view of the apparatus shown in Fig. 1, and Fig. 3 is a diagram illustrating the electric circuits involved in the employment of this invention.

1 indicates the base on which the apparatus is mounted. Upon this base is secured a pair of vertical coils 2, adjacent and parallel to each other, and between said coils 2 extends transversely thereto a shaft 3 mounted upon uprights 4 fastened to the base 1. Upon the shaft 3 is mounted a coil 5 projecting within the coils 2 and normally held in a plane at an angle transverse to the planes of the coils 2. The coil 5 is adapted to oscillate through a moderate angle within the coils 2. The ends of the shaft 3 may be formed with knife edges to facilitate the swing of the coil 5. The coil 5 is held in its normal angular position, and is governed in its oscillating movement, by means of weights 6, mounted adjacent to the ends of rods 7, projecting from suitable clamps 8, secured to the oscillating coil 5, and these weights 6 are adjustable on the rods 7 by any suitable means, such as a screw-thread 7' on the rods 7 with which the weight 6 engages, and on which it can be turned so as to regulate the movement of the oscillating coil 5. Upon the base 1 is also mounted a registering set of dials or other suitable registering device 9, which may be operated by any suitable electrical device, and as here shown, by means of an electromagnet 10, the circuit of which is through the contacts indicated at 11, 12, the contact 12 being stationary and mounted on the base 1, and the contact 11 being mounted on the arm 13 depending from the shaft 3 and operated in relation to the contact 12 by means of the shaft 3.

The electro-magnet 10 operates the registering mechanism 9 by means of the oscillation of its armature 14 which in turn operates a pawl 15 or other suitable device for moving the registering mechanism step by step. This, however, not being an essential feature of the apparatus, may be constructed in any way desired.

The vertical coils 2 are in reality two coils each forming virtually a series winding and a shunt winding, as shown in Fig. 3, where the series coil is indicated by means of heavy black lines. The current enters at 16, and passes through the series winding to one side of the load, consisting of a number of lamps 17 connected in parallel, returning by the negative main 18.

The inner oscillating coil 5 mounted on the shaft 3, is connected in shunt to the mains or lines 18, 19, by a permanent connection, and the outer fine wire coils of the coils 2, 2, are connected also in shunt, but through the contacts 11, 12.

The opening and closing of the contact 11 are under the control of the operating coil. This contact is in circuit with the electro-magnet 10.

The directions of the currents are as follows: The coarse wire coils of the coils 2, 2 are connected so as to have the current flow through them in an opposite direction to the current which would flow through the coils 2, 2 when the contact 11 is closed. The current in the fine wire coils of the coils 2, 2, is of very small amount, owing to the high resistance of the wire in the coils and their numerous turns. The adjustment of the weights 6 is such as to maintain the oscillating coil 5 in its normal position, as shown, so that the contact 11, when there is no current passing in the coarse wire or when there are no lights in circuit, will be slightly open, leaving no electrical connection between the contacts 11 and 12. Hence no dynamic action will be produced; for while the oscillating coil 5 would be traversed by current in shunt, there would be no current in either the fine wire or coarse wire of the coils 2, 2. It should be here mentioned that the winding of the oscillating coil 5 is fine and of high resistance, so as to take but a very small current. It has, however, numerous turns. The switching on of a lamp between lines 18, 19 causes current to flow in the coarse wire coils of the coils 2, and the connections of the oscillating coil are such that the electro-dynamic action, by the mutual action of the currents now traversing the coils, will be to close the contact 11. The instant this contact, however, closes the circuit through the fine wire coils of the coils 2, 2, the latter are in shunt and are traversed by a current in opposition to the current in the coarse wire coils of coils 2, 2, with the result of an immediate opening of the contact 11 and the rupture of the circuit through the fine wire coils of the coils 2, 2, which caused the opening. The contact is restored very soon after by the first action being repeated, and so a vibration of the coil 5 is set up and maintained. At each closure of the contact 11, however, the electro-magnet 10 is operated and works the register in direct relation to the number of closures.

It will be seen that to obtain the above mentioned actions, the direction of the currents in the oscillating inner coil 5 and in the coarse wire of the surrounding coils 2, 2, will be such as to tend to cause the oscillating coil to get into parallelism and close the contact, while the direction of the currents at any moment in the fine wire coils of coils 2, 2, with relation to the oscillating coil 5 will be such as to throw the contact open, and that, therefore, the coarse and fine wire stationary coils of coils 2, 2 are differentially arranged. The contact 11 may be tipped with silver or carbon to stand the very slight sparking which occurs on the closing and opening of the high resistance circuit in coils 2, 2, and the movable contact 11 may be carried upon an elastic arm depending from the shaft 3. By means of the adjustable weights of the oscillating coil and the resiliency of the spring which carries the movable contact, there can be obtained a fairly approximate registry depending upon the load on the coarse wire or series coils; that is, if the number of lamps be doubled, the rate of opening or closing of the contacts 11 and 12 will be increased in about the same proportion, while the registry obtainable, therefore, from 10 will be about doubled. If the number of lamps be trebled, the same relation nearly can be obtained, so that my device forms a counting arrangement or metering arrangement adapted for use where a simple instrument is desired to measure the consumption of energy or current in an electric circuit. The instrument also responds to the voltage of the lines, since the vigor of its actions depends upon the flow of current in the oscillating coil as well as the flow of current in the fine wire outer coils of coils 2, 2, and of course upon the load or flow of current in the coarse or series coils of coils 2, 2. Hence, a high potential or a high load will accelerate the instrument in its vibrations so that the response is not simply to current, but also to volts, while the registry is an integration of the watts or watts multiplied by time.

What I claim as new, and desire to secure by Letters Patent of the United States, is—

1. An electric meter composed of stationary series and shunt coils, a movable armature or coil acted upon differentially by such series and shunt coils, a circuit-breaker in the shunt circuit controlled by the movement of said armature, a registering device, and a motor device controlled by the circuit-breaker and operating the registering device.

2. In an electric meter, stationary series and shunt coils, an oscillating coil or armature arranged transversely to the stationary coils and acted upon differentially by the latter, and a circuit breaker in the shunt circuit controlled by the movement of the oscillating coil.

3. In an electric meter, stationary series and shunt coils, an oscillating coil or armature mounted within and transverse to the said stationary coils, and adjustably held in its normal position, and provided with a swinging contact arm, a contact in the shunt circuit with which the swinging contact arm is normally out of contact, a registering device, and means for operating the latter, located in the circuit through the fixed contact, as set forth.

4. An electric meter comprising series and shunt coils, acting differentially upon a movable armature or coil, a circuit breaker in the shunt circuit controlled by the movement of the armature, a registering device, and means controlled by the circuit breaker and operating the registering device.

5. The method of metering electric currents consisting in deflecting a movable armature in one direction by the current to be metered, deflecting it in the opposite direction by a current of fairly constant value, such as a current in shunt to the mains of a constant potential system, said current being controlled by a movable contact opened and closed at each armature oscillation, and registering the frequency of the oscillations.

6. A meter for electric currents comprising an armature deflected by a coil conveying the current to be measured, a differential coil or winding conveying a current in opposition thereto and adjusted to be always in excess in its differential effect to the effect of the first winding, a circuit breaker and maker in circuit with the differential winding, or controlling the same, adjusted to be closed by the deflecting action of the main metered current and opened by the opposing or differential action of the differential current, and means for registering the oscillations of the deflected armature, substantially as described.

In witness whereof I have hereunto set my hand this 14th day of February, 1895.

ELIHU THOMSON.

Witnesses:
JOHN W. GIBBONEY,
WALTER S. MOODY.